United States Patent
Rowe

(10) Patent No.: US 12,361,009 B2
(45) Date of Patent: Jul. 15, 2025

(54) SYSTEM AND METHOD FOR PROVIDING END-TO-END OBSERVABILITY FOR DISTRIBUTED EVENT-DRIVEN APPLICATIONS

(71) Applicant: JPMorgan Chase Bank, N.A., New York, NY (US)

(72) Inventor: James Rowe, Glasgow (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 211 days.

(21) Appl. No.: 18/212,030

(22) Filed: Jun. 20, 2023

(65) Prior Publication Data
US 2024/0428243 A1     Dec. 26, 2024

(51) Int. Cl.
| | | |
|---|---|---|
| G06F 11/36 | (2025.01) | |
| G06F 16/00 | (2019.01) | |
| G06F 16/2455 | (2019.01) | |
| G06F 16/955 | (2019.01) | |
| G06Q 20/40 | (2012.01) | |
| H04L 69/22 | (2022.01) | |

(52) U.S. Cl.
CPC ........ G06F 16/24568 (2019.01); G06F 16/00 (2019.01); G06F 16/9566 (2019.01); G06Q 20/401 (2013.01); H04L 69/22 (2013.01)

(58) Field of Classification Search
CPC ........... G06F 16/24568; G06F 16/9566; G06F 16/00; G06F 11/3006; H04L 69/22; H04L 9/50; G06Q 20/401
See application file for complete search history.

(56) References Cited

U.S. PATENT DOCUMENTS

| | | | | |
|---|---|---|---|---|
| 11,526,425 | B1 * | 12/2022 | Karis | G06F 16/24568 |
| 11,860,760 | B1 * | 1/2024 | Agarwal | G06F 16/00 |
| 12,021,725 | B1 * | 6/2024 | Hulick, Jr. | H04L 69/22 |
| 2023/0156093 | A1 * | 5/2023 | Danyi | G06F 16/9566 |
| | | | | 709/227 |

OTHER PUBLICATIONS

Opentelemetry-specification/specification/trace/semantic_conventions/messaging.md, retrieved Sep. 20, 2023 (https://github.com/opentelemetry/opentelemetryspecification/blob/main/specification/trace/semantic_conventions/messaging.md).

* cited by examiner

*Primary Examiner* — Tuan A Vu
(74) *Attorney, Agent, or Firm* — GREENBLUM AND BERNSTEIN, P.L.C.

(57) ABSTRACT

A method and system for providing end-to-end observability for distributed event-driven applications are disclosed. The method includes generating a trace for an executed transaction and decomposing the generated trace into multiple synthetic traces or sub-traces. Each of the synthetic traces or sub-traces represents an operation performed for a discrete application function contained within that transaction. For each sub-trace a synthetic root span is generated, the root span representing an end-to-end time to process the respective application function.

20 Claims, 9 Drawing Sheets

SYSTEM AND METHOD FOR PROVIDING END-TO-END OBSERVABILITY FOR DISTRIBUTED EVENT-DRIVEN APPLICATIONS

TECHNICAL FIELD

This disclosure generally relates to a system and method for providing end-to-end observability for a trace including asynchronous spans generated in distributed event-driven applications.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, microservice architectures are commonplace for building complex applications. Such architectural style eschews a single, monolithic component in favor of multiple smaller components that may be deployed across difference servers, which may be referred to as microservices. Microservices may interoperate to deliver application functionality. Interoperability of microservices for providing application functionality may have many benefits in formation of application, providing updates and scalability. However, utilization of microservices makes it more difficult to observe application behavior and performance when troubleshooting when an application is not behaving or performing as expected.

Typically, application performance may be observable using telemetry, which includes distributed tracing of operations. More specifically, tracing may include recording of operations performed and the time taken to perform them when processing a transaction spanning multiple different application components. Although conventional distributed tracing may be able to provide observations of behavior and performance of components that communicate synchronously (i.e., where one component makes a request to another component and waits for its response before continuing), it is ineffective for providing observations of application architectures involving asynchronous communications, such as event-driven architectures or data-processing pipelines.

In an asynchronous communication architecture, a component may perform processing in response to an event before asynchronously invoking other components to perform further processing, which may typically be executed in parallel. Unlike the synchronous model, a transaction with an asynchronous event-driven architecture may contain branches resulting in multiple end points, rather than a single endpoint that may be the case for a synchronous transaction. Each path within an asynchronous transaction, from the start of the transaction to one of many end points, represents the set of operations performed during a discrete application function, which may have behavioral characteristics and performance requirements that differ from other application functions in the same transaction (e.g., one path may require three second response time where another path may require ten second response time).

However, conventional observability techniques, such as distributed tracing, treat the entire asynchronous transaction as a single unit. However, in such a scenario, measuring of the duration of the asynchronous transaction from the start to the maximum endpoint may not yield meaningful observations or insights as it bundles together different application functions that were executed in parallel. Accordingly, conventional observability techniques are technically limited in providing effective observations of behavior and performance of asynchronous application transactions.

SUMMARY

According to an aspect of the present disclosure, a method for providing end-to-end observability for distributed event-driven applications is provided. The method includes executing, by a processor, a transaction including a plurality of operations and generating a trace for the executed transaction: receiving, by a plurality of local collectors, a plurality of spans generated from the plurality of operations executed in differing host servers: filtering, by at least one local collector among the plurality of local collectors, asynchronous spans among the plurality of spans, such that only spans representing inter-process communications are forwarded to a global collector cluster including a plurality of global collectors: identifying, by a load balancer, a target global collector among the plurality of global collectors for routing the spans associated with the generated trace: transmitting, by the load balancer to the target global collector, the spans associated with the generated trace; waiting, by the target global collector, until all of the asynchronous spans associated with a discrete path through the generated trace is received: decomposing, by the target global collector, the trace into a plurality of sub-traces; and deriving, by the target global collector, end-to-end metrics for each of the sub-traces.

According to another aspect of the present disclosure, re-parenting the internal spans, such that the internal spans may be related to one another in a parent-child relationship.

According to another aspect of the present disclosure, the global collector cluster is in a global cluster mode.

According to yet another aspect of the present disclosure, the global collector cluster is in a regional cluster mode.

According to another aspect of the present disclosure, the global collector cluster is in a line of business cluster mode.

According to a further aspect of the present disclosure, at least one of the plurality of local collectors and at least one of the plurality of global collectors reside on a same network.

According to yet another aspect of the present disclosure, at least one of the plurality of local collectors and at least one of the plurality of global collectors reside on different networks.

According to a further aspect of the present disclosure, the method further includes sampling, by the target global collector, one or more exemplary sub-traces.

According to another aspect of the present disclosure, the method further includes sampling, by the target global collector, the generated trace.

According to a further aspect of the present disclosure, at least one of the sub-trace corresponds to an operation performed for a discrete application function contained within the transaction.

According to a further aspect of the present disclosure, at least one of the plurality of operations includes one or more sub-operations.

According to a further aspect of the present disclosure, a span is generated for each of the plurality of operations, and a sub-span is generated for each of the one or more sub-operations.

According to a further aspect of the present disclosure, the trace is defined by a tree of the plurality of spans.

According to a further aspect of the present disclosure, each of the sub-traces corresponds to an operation that is unrelated from one another.

According to a further aspect of the present disclosure, each of the sub-traces include different spans from one another.

According to a further aspect of the present disclosure, at least one of the plurality of local collectors reside in one of the host servers.

According to a further aspect of the present disclosure, each of the sub-traces resembles a synchronous trace.

According to a further aspect of the present disclosure, a span identifies a specific operation being executed, and a start time and an end time of the specific operation executed.

According to another aspect of the present disclosure, a non-transitory computer readable storage medium that stores a computer program for providing end-to-end observability for distributed event-driven applications is provided. The computer program, when executed by a processor, causes a system to perform multiple processes including: executing, by a processor, a transaction including a plurality of operations and generating a trace for the executed transaction: receiving, by a plurality of local collectors, a plurality of spans generated from the plurality of operations executed in differing host servers: filtering, by at least one local collector among the plurality of local collectors, asynchronous spans among the plurality of spans, such that only spans representing inter-process communications are forwarded to a global collector cluster including a plurality of global collectors; identifying, by a load balancer, a target global collector among the plurality of global collectors for routing the spans associated with the generated trace: transmitting, by the load balancer to the target global collector, the spans associated with the generated trace: waiting, by the target global collector, until all of the asynchronous spans associated with a discrete path through the generated trace is received: decomposing, by the target global collector, the trace into a plurality of sub-traces; and deriving, by the target global collector, end-to-end metrics for each of the sub-traces.

According to an aspect of the present disclosure, a system for providing end-to-end observability for distributed event-driven applications is provided. The system includes a memory, a display and a processor. The processor is configured to perform: executing, by a processor, a transaction including a plurality of operations and generating a trace for the executed transaction: receiving, by a plurality of local collectors, a plurality of spans generated from the plurality of operations executed in differing host servers: filtering, by at least one local collector among the plurality of local collectors, asynchronous spans among the plurality of spans, such that only spans representing inter-process communications are forwarded to a global collector cluster including a plurality of global collectors; identifying, by a load balancer, a target global collector among the plurality of global collectors for routing the spans associated with the generated trace: transmitting, by the load balancer to the target global collector, the spans associated with the generated trace: waiting, by the target global collector, until all of the asynchronous spans associated with a discrete path through the generated trace is received: decomposing, by the target global collector, the trace into a plurality of sub-traces; and deriving, by the target global collector, end-to-end metrics for each of the sub-traces.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
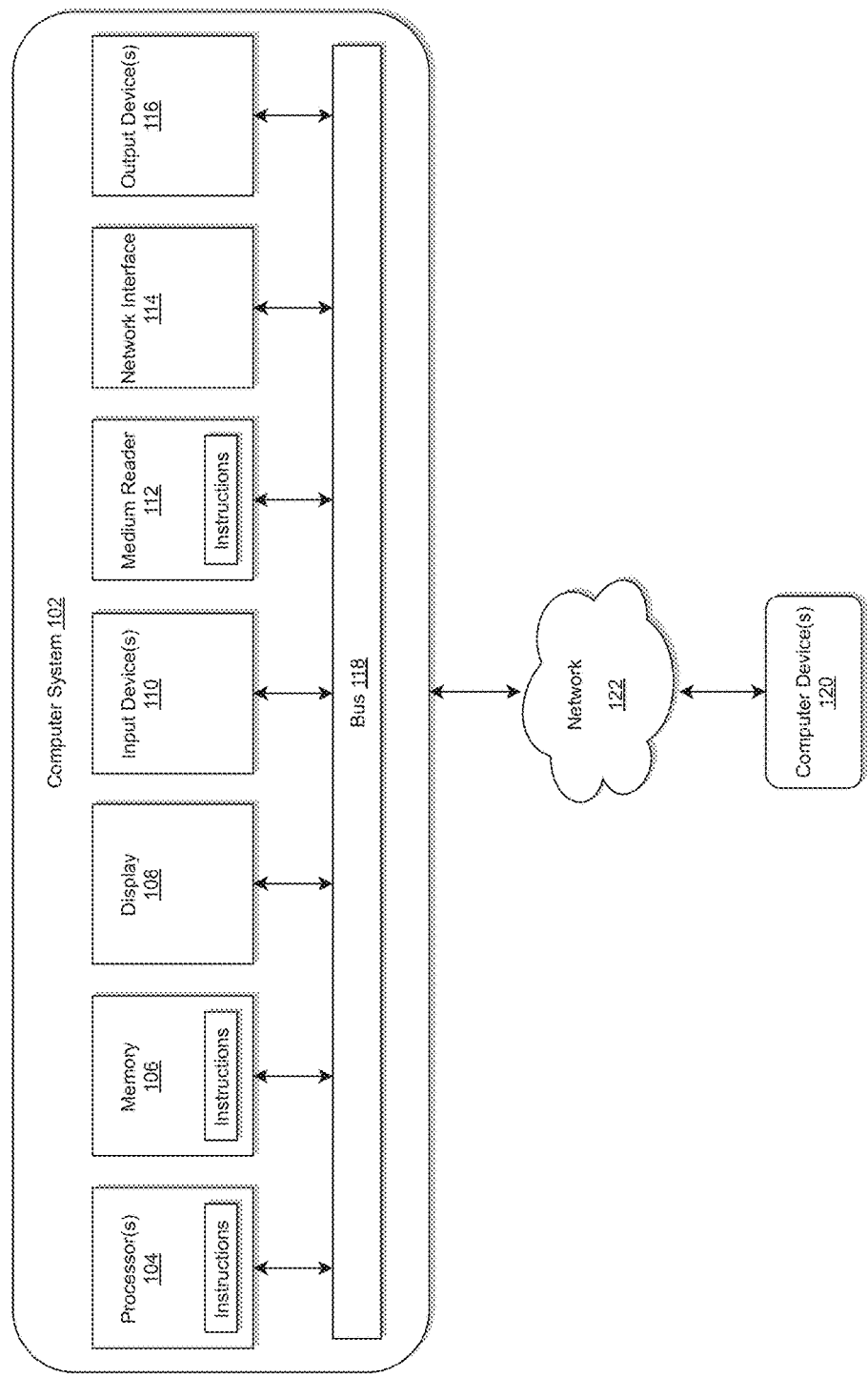
FIG. 1 illustrates a computer system for implementing a distributed trace system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a distributed trace system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, or the like.

The computer system 102 may be in communication with one or more additional computer devices 120 via a network 122. The network 122 may be, but is not limited thereto, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
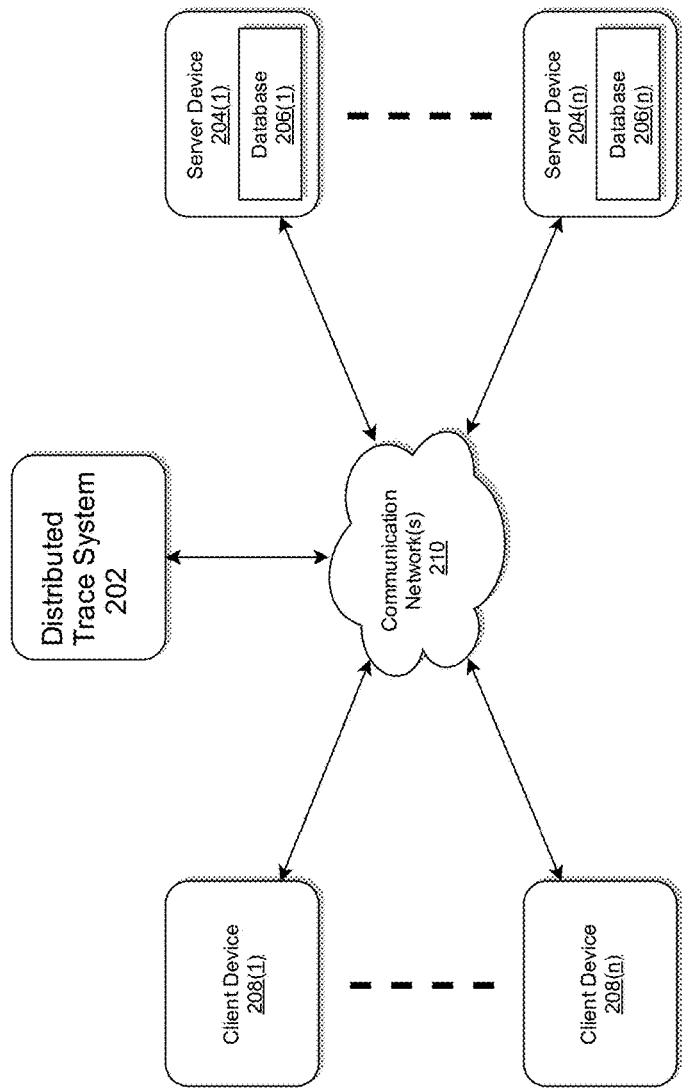
FIG. 2 illustrates an exemplary diagram of a network environment with a distributed trace system in accordance with an exemplary embodiment.

FIG. 2 illustrates an exemplary diagram of a network environment with a distributed trace system in accordance with an exemplary embodiment.

A distributed trace system 202 may be implemented with one or more computer systems similar to the computer system 102 as described with respect to FIG. 1.

The distributed trace system 202 may store one or more applications that can include executable instructions that, when executed by the distributed trace system 202, cause the distributed trace system 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the distributed trace system 202 itself, may be located in virtual server(s) running in a cloud-based computing environment rather than being tied to one or more specific physical network computing devices. Also, the application(s) may be running in one or more virtual machines (VMs) executing on the distributed trace system 202. Additionally, in one or more embodiments of this technology, virtual machine(s) running on the distributed trace system 202 may be managed or supervised by a hypervisor.

In the network environment 200 of FIG. 2, the distributed trace system 202 is coupled to a plurality of server devices 204(1)-204(n) that hosts a plurality of databases 206(1)-206(n), and also to a plurality of client devices 208(1)-208(n) via communication network(s) 210. According to exemplary aspects, databases 206(1)-206(n) may be configured to store data that relates to distributed ledgers, blockchains, user account identifiers, biller account identifiers, and payment provider identifiers. A communication interface of the distributed trace system 202, such as the network interface 114 of the computer system 102 of FIG. 1, operatively couples and communicates between the distributed trace system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the distributed trace system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The distributed trace system 202 may be a standalone device or integrated with one or more other devices or apparatuses, such as one or more of the server devices 204(1)-204(n), for example. In one particular example, the distributed trace system 202 may be hosted by one of the server devices 204(1)-204(n), and other arrangements are also possible. Moreover, one or more of the devices of the distributed trace system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the distributed trace system 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the distributed trace system 202 that may efficiently provide a platform for implementing a cloud native distributed trace system module, but the disclosure is not limited thereto.

The client devices 208(1)-208(n) may run interface applications, such as standard web browsers or standalone client applications, which may provide an interface to communicate with the distributed trace system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the distributed trace system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the distributed trace system 202, the server devices 204(1)-204(n), or the client devices 208(1)-208(n), for example, may be configured to operate as virtual instances on the same physical machine. For example, one or more of the distributed trace system 202, the server devices 204(1)-204(n), or the client devices 208(1)-208(n) may operate on the same physical device rather than as separate devices communicating through communication network(s) 210. Additionally, there may be more or fewer distributed trace system 202, server devices 204(1)-204(n), or client devices 208(1)-208(n) than illustrated in FIG. 2. According to exemplary embodiments, the distributed trace system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
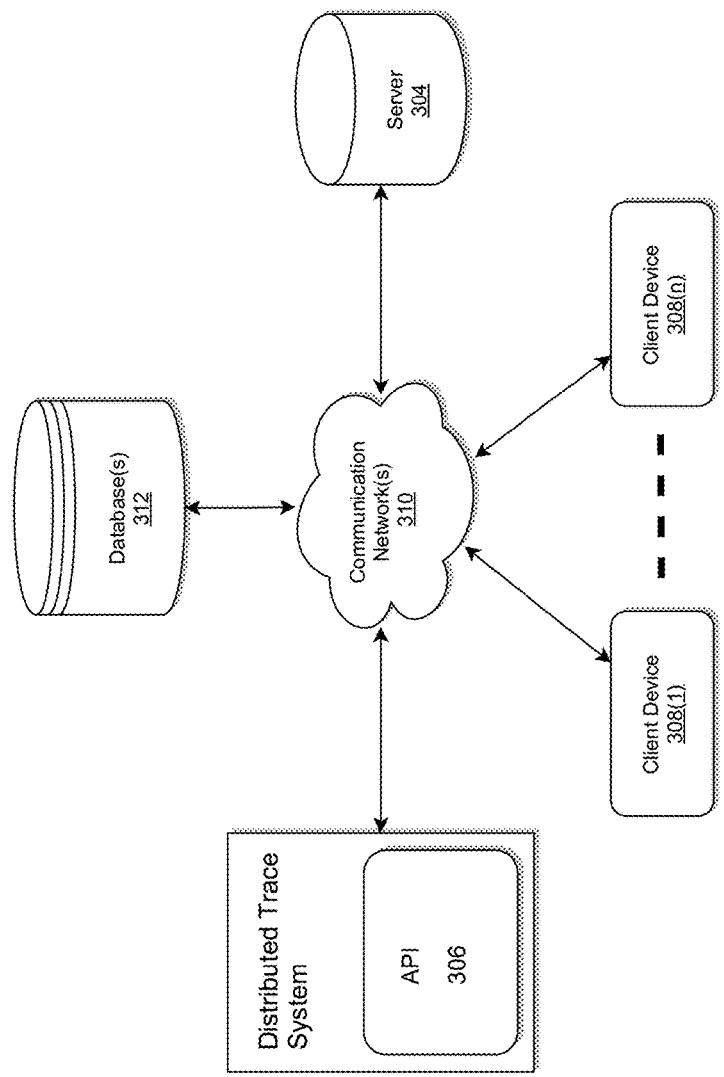
FIG. 3 illustrates a system diagram for implementing a distributed trace system in accordance with an exemplary embodiment.

FIG. 3 illustrates a system diagram for implementing a distributed trace system in accordance with an exemplary embodiment.

As illustrated in FIG. 3, the system 300 may include a distributed trace system 302 within which a group of API modules 306 is embedded, a server 304, a database(s) 312, a plurality of client devices 308(1) . . . 308(n), and a communication network 310.

According to exemplary embodiments, the distributed trace system 302 including the API modules 306 may be connected to the server 304, and the database(s) 312 via the communication network 310. Although there is only one database that has been illustrated, the disclosure is not limited thereto. Any number of databases may be utilized. The distributed trace system 302 may also be connected to the plurality of client devices 308(1) . . . 308(n) via the communication network 310, but the disclosure is not limited thereto.

According to exemplary embodiment, the distributed trace system 302 is described and shown in FIG. 3 as including the API modules 306, although it may include other rules, policies, modules, databases, or applications, for example. According to exemplary embodiments, the database(s) 312 may be embedded within the distributed trace system 302. According to exemplary embodiments, the database(s) 312 may be configured to store configuration details data corresponding to a desired data to be fetched from one or more data sources, but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable distributed trace system as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the distributed trace system 302. In this regard, the plurality of client devices 308(1) . . . 308(n) may be "clients" of the distributed trace system 302 and are described herein as such. Nevertheless, it is to be known and understood that the plurality of client devices 308(1) . . . 308(n) need not necessarily be "clients" of the distributed trace system 302, or any entity described in association therewith herein. Any additional or alternative relationship may exist between either or both of the plurality of client devices 308(1) . . . 308(n) and the distributed trace system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the distributed trace system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The distributed trace system 302 may be the same or similar to the distributed trace system 202 as described with respect to FIG. 2, including any features or combination of features described with respect thereto.

Figure 4:
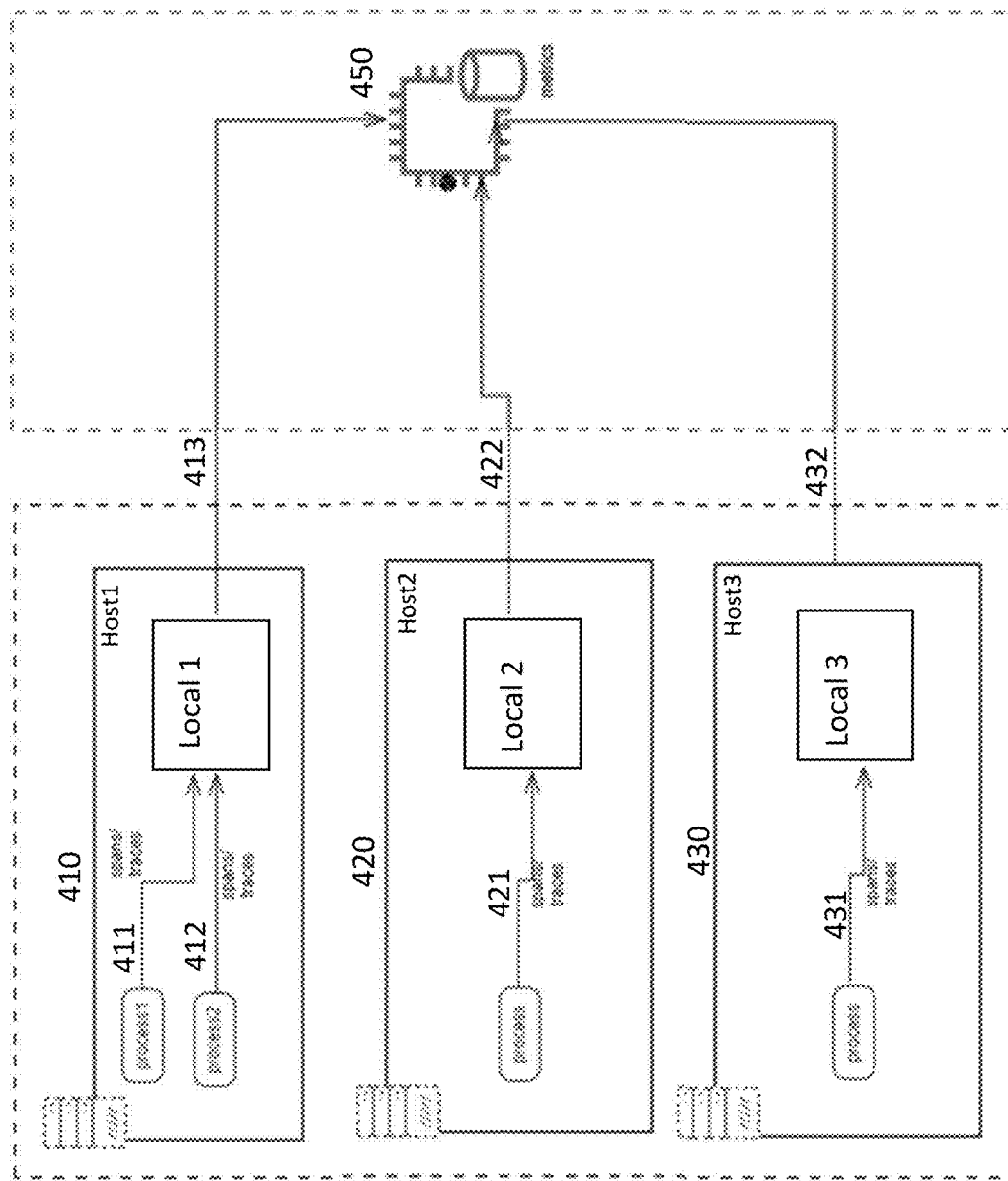
FIG. 4 illustrates a conventional telemetry architecture for providing end-to-end observability display for distributed event-driven applications.

FIG. 4 illustrates a conventional telemetry architecture for providing end-to-end observability display for distributed event-driven applications.

As illustrated in FIG. 4, the conventional telemetry architecture may include multiple local collectors, Local 1, Local 2 and Local 3 that may reside on on-premise or private network. Each of the local collectors may collect spans/traces generated by corresponding processes. For example, Local 1 collector will collect spans/traces 411 generated by process 1 and spans/traces 412 generated by process 2 within Host 1.

Similarly, Local 2 collector will collect spans/traces 421 generated by its corresponding process on Host 2, and Local 3 collector will collect spans/traces 431 generated by its corresponding process on Host 3.

A trace may be made up of one or more spans. Also, a span may correspond to or represent a unit of work or operation. In addition, a first span of the trace may be called a root span, and each root span may represent a request from start to finish.

The spans/traces collected by each of the local collectors are then transmitted to a centralized server 450 with computing capabilities, which may reside on another network (e.g., public cloud) different from the network on which the local collectors reside (e.g., private cloud or on-premise network). The centralized server 450 may store the metrics from each of the Host 1, Host 2 and Host 3 and determine relationships between the spans/traces that were transmitted from each of the Host 1, Host 2 and Host 3. The metrics may be generated for corresponding spans/traces as soon as they are received at the centralized server 450.

As shown in FIG. 4, however, having multiple processes run on different hosts may lead to multiple processes communicating asynchronously. Performance metrics or duration of communication is measured for assessment of service level indicators (SLIs). For example, duration between a start time of initiating operation in one process (e.g., consumption of a message off a queue) and an end time of the final operation in another process that may be run on a different host (e.g., publishing a message to an external system) may serve as an SLI.

A service request that involves an asynchronous hop starts with a root span and optionally other child spans under the root span on a host. The service request may then move onto a next process, which may be asynchronously invoked and run on a different host, creating a new parent span (and other child spans under it). A more detailed illustration of such processes are provided in FIG. 5 with corresponding explanation as provided below.

Figure 5:
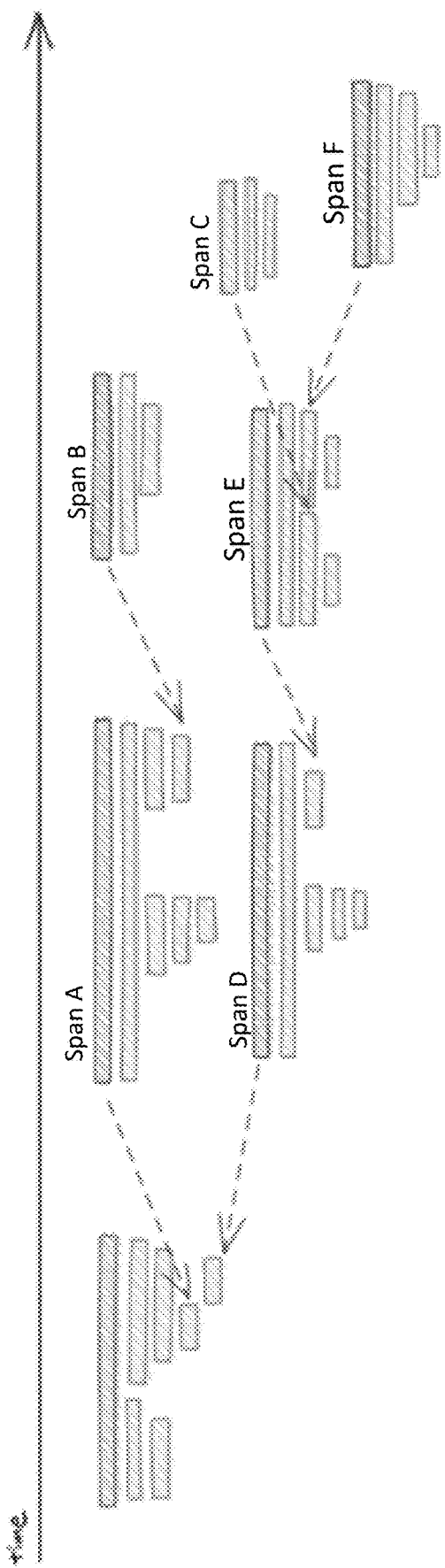
FIG. 5 illustrates a conventional end-to-end observability display for distributed event-driven applications.

FIG. 5 illustrates a conventional end-to-end observability display for distributed event-driven applications.

As illustrated in FIG. 5, a set of spans (e.g., span A, span B, span C, span D, span E, and span F) may be provided, which in the aggregate represents a single logical trace. However, in the single logical trace, there are distinct use cases/flows that are unrelated to one another due to asynchronous nature of processing. In an example, span A may represent a trade booking, span B may represent a risk computation, and span C and span D feed to different downstream systems. However, despite having flows that are unrelated to one another, each of these spans may be represented as sub-spans under a singular trace.

At least since different flows or use cases are captured in a single logical trace, defining of a service level objective (SLO) for the entire trace would not provide meaningful information. More specifically, at least since there is a single start point (e.g., trade booking) but multiple end points (e.g., risk computation, feeding a downstream system, etc.), each use case would require a different SLO and not captured in a single SLO as provided in the conventional functional flow. Accordingly, an SLO should be defined for each workflow for better observability at the use case level, which the conventional end-to-end telemetry is unable to provide.

Figure 6:
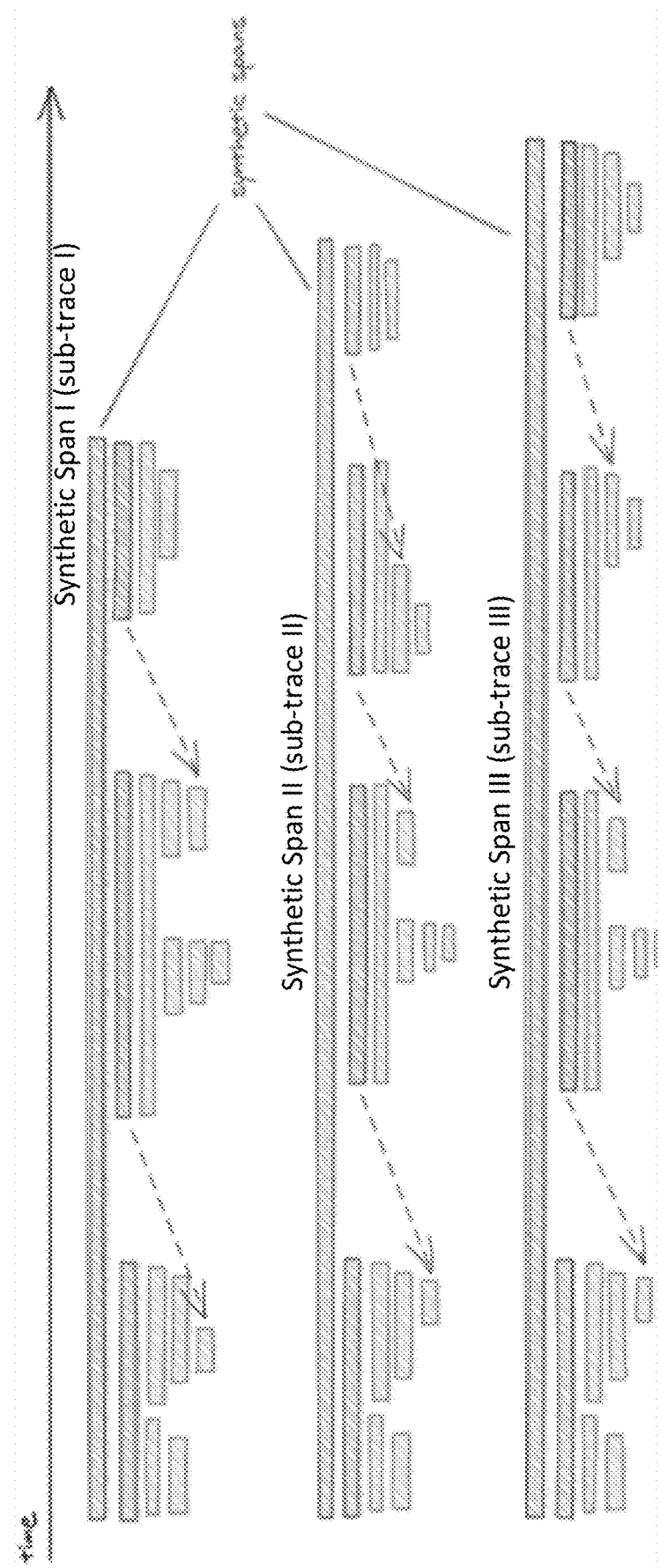
FIG. 6 illustrates for providing end-to-end observability display for distributed event-driven applications in accordance with an exemplary embodiment.

FIG. 6 illustrates for providing end-to-end observability display for distributed event-driven applications in accordance with an exemplary embodiment.

Distributed tracing may be common with conventional decentralized/distributed systems and microservice architecture. Although conventional decentralized/distributed systems may address use cases for linear flows easily, complexity may arise from flows that branch out like in a tree structure, where if the entire flow is considered as a trace, subsets of the flow represents distinct observable use cases. In order to address this scenario, a trace would need to be decomposed into sub-traces. Further, an ability to collect end-to-end sub-trace with asynchronous spans before sampling would be needed. The conventional systems may miss out some spans as they may be configured based on factors, such as wait times, number of traces or the like. Further, the conventional systems may be limited to sampling the entire trace rather than select sub-traces.

According to exemplary aspects, a trace describing complex asynchronous processing may be transformed into a set of synthetic traces or sub-traces, each of which may resemble a synchronous trace.

According to further aspects, a distributed trace may describe operations and time taken to perform them when processing a given transaction. In an example, each operation of interest within a transaction may be represented by a span. A span may include a name, which may identify a specific operation being performed, and a start time and an end time. Each span of a given kind, which may denote a role of the operation that is represented by the span.

Further, according to exemplary aspects, spans may be related to other sp ans. In an example, an operation may invoke one or more sub-operations to form a parent-child relationships. Accordingly, a trace may be organized as a tree of spans.

According to exemplary aspects, a trace representing a transaction may be decomposed into one or more sub-traces, where each sub-trace may represent the operations performed for a discrete application function contained within that transaction. For example, in a simple event-driven application architecture including components A, B and C, in one scenario, component A received an event E and processes it, before asynchronously invoking B and C for further processing of the event in parallel.

In response, the transaction trace for event E may be decomposed into two sub-traces: (i) one sub-trace may describe a path from A to B, which includes the tree of spans representing all operations performed by components A and B when processing event E; and (ii) other sub-trace for a path from A to C, which includes the tree of spans representing all operations performed by components A and C when processing event E. In this example, a synthetic root span may be constructed for each sub-trace. The synthetic root span may represent the end-to-end time taken to process that particular application function.

According to further aspects, the logic to decompose the trace may be implemented when it is known whether a pair of spans in a parent/child relation represents a synchronous or asynchronous invocation. Those identified as asynchronous invocations represents a branch in the transaction, which results in new paths.

Such an exemplary solution described above may turn a trace describing complex asynchronous processing into a set of synthetic traces that each resemble a synchronous trace. Such an approach may allow leveraging existing tooling that is capable of analyzing synchronous traces, which are incapable of analyzing asynchronous traces.

According to exemplary aspects, a single trace may be decomposed into multiple sub-traces. For example, spans from trade booking to risk computation would form a sub-trace. Similarly, the spans from the trade booking to each downstream feed would form other sub-traces. FIG. 6 exemplarily illustrates the decomposition of the single trace of FIG. 5 into three distinct sub-traces identified as synthetic span I, synthetic span II and synthetic span III.

According to exemplary aspects, decomposition of a trace into one or more sub-traces may serve at least two purposes. First, the decomposition of a trace allows derivation of duration or latency metrics on the end-to-end flow. Second, the decomposition supports the goal of tail-based sampling to store meaningful exemplars describing end-to-end flows.

According to exemplary aspects, three problems are identified for resolution.

First, trace context needs to be propagated from one process to another. This avoids problems using business or existing system data keys. Context propagation is a mechanism that moves context between services and processes. By doing so, it assembles a distributed trace. It also serializes or deserializes span context and provides the relevant trace information to be propagated from one service to another.

Second, span data from the distributed processes need to be collated to produce an end-to-end picture for a use case as shown below. In an example, this may be solved in the processing tier or in the storage tier which have different cost profiles associated.

Third, trace needs to be decomposed into discrete/sub-traces based on the use case/flow.

Further, the above described end-to-end traces using tail-based sampling may be stored in a centralized storage that may be formed of a network of databases.

Figure 7:
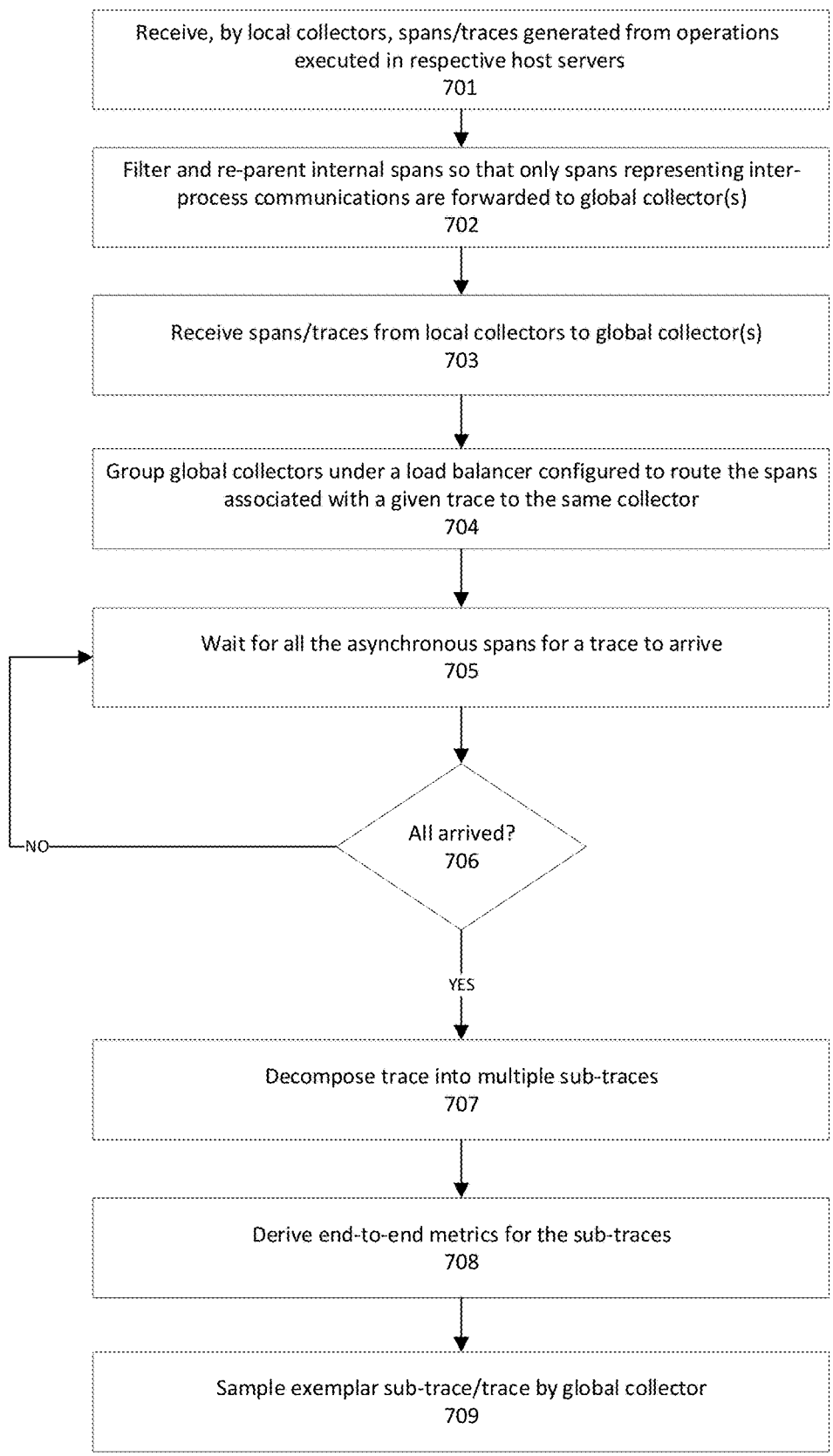
FIG. 7 illustrates a method for performing end-to-end tracing of asynchronous processes in accordance with an exemplary embodiment.

FIG. 7 illustrates a method for performing an end-to-end tracing of asynchronous processes in accordance with an exemplary embodiment.

In operation 701, local collectors may collect spans or traces that are generated from processes or operations executed in respective host servers. For example, a transaction may include various operations that may be performed at differing hosts or host servers/devices. When such operations are executed, corresponding spans may be generated.

For example, an operation or process executed in a first host server may generate one or more spans for collection by a first local collector, while an operation or process executed in a second host server may generate one or more spans for collection by a second local collector. According to exemplary aspects, local collectors may reside within corresponding host servers.

According to exemplary aspects, a trace may represent a transaction involving multiple operations. Further, one or more of the operations may include one or more sub-operations, that creates a parent-child relationship. An operation may be represented by a span, and sub-operations may be represented by sub-spans. Spans and sub-spans may indicate a type, role of the operation or sub-operation, and a start time and an end time. Further, spans may be related to other spans. As such, a trace may be organized as a tree of spans. In addition, a trace may be decomposed into one or more sub-traces, in which each sub-trace represents operations performed for a discrete application function contained within that transaction.

In operation 702, the local collectors may optionally filter and re-parent internal spans so that only spans representing inter-process communication between services, databases or the like are forwarded as asynchronous spans to one or more global collectors. According to exemplary aspects, re-parent may refer to modifying or forming parent-child relationships.

In operation 703, the one or more global collectors may receive spans or traces from one or more local collectors. According to exemplary aspects, a global collector may communicate with one or more local collectors. According to further aspects, global collectors and one or more of the local collectors may reside on the same network or differing networks.

In operation 704, the global collectors may be grouped under a load balancer, and the grouped global collectors may be configured such that the spans associated with a given trace may be routed to the same global collector. According to exemplary aspects, there may be differing cluster modes. For example, the cluster modes may include a global cluster mode, a regional cluster mode, and a line of business (LOB) cluster mode.

Global cluster mode may support end-to-end distributed traces across all owners and regions. The global cluster mode may require getting span data from all over the globe to a single cluster. Regional cluster mode may be set up per region. Such a regional cluster mode may not support end-to-end tracing for processing spanning multiple regions. Lastly, LOB cluster mode may set up cluster per LOB. Here, the LOB cluster mode may not support end-to-end tracing for processing spanning of multiple LOB services.

In operation 705, for each of the traces, clusters of global collectors may wait for all of the asynchronous spans for a given discrete path through the respective asynchronous end-to-end trace to arrive.

In operation 706, when all of the spans for a given discrete path through the respective asynchronous trace is determined to have arrived, a sub-trace may be decomposed in operation 707. On the other hand, when all of the spans are determined not to have arrived in operation 706, the method proceeds back to operation 705 and continue waiting until all of the spans for the remaining paths through the respective trace have been received.

According to exemplary aspects, a single trace may be decomposed into multiple sub-traces. For example, spans from trade booking to risk computation would form a sub-trace. Similarly, the spans from the trade booking to each downstream feed would form other sub-traces. According to exemplary aspects, decomposition of a trace into one or more sub-traces may serve at least two purposes. First, the decomposition of a trace allows derivation of duration or latency metrics on the end-to-end flow. Second, the decomposition supports the goal of tail based sampling to store meaningful exemplars describing end-to-end flows.

In operation 708, end-to-end metrics for the sub-traces are then derived. In an example, a sub-trace may correspond to an operation performed for a discrete application function contained within a respective transaction. Accordingly, the sub-trace may include spans and sub-spans for the operation that is performed.

In operation 709, exemplar sub-traces and/or trace may be then sampled by the global collectors. Accordingly, based on the above noted method, a trace describing a complex asynchronous processing may be transformed to provide a set of synthetic traces that each resemble synchronous trace.

Further to the above, one or more of the above noted operations may be performed using one or more machine learning (ML) or artificial intelligence (AI) algorithms executed by a processor. For example, identification of operation/sub-operation, span/sub-span, relationship between spans, load balancing operations, identification of asynchronous operations, clustering of global collectors, decomposition of a trace and the like may be performed using the one or more ML or AI algorithms.

In an example, AI or ML algorithms may be generative, in that the AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations are initially performed to provide initial training. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment the ML or AI models may be generated using at least one from among an artificial neural network technique, a decision tree technique, a support vector machines technique, a Bayesian network technique, and a genetic algorithms technique.

Figure 8A:
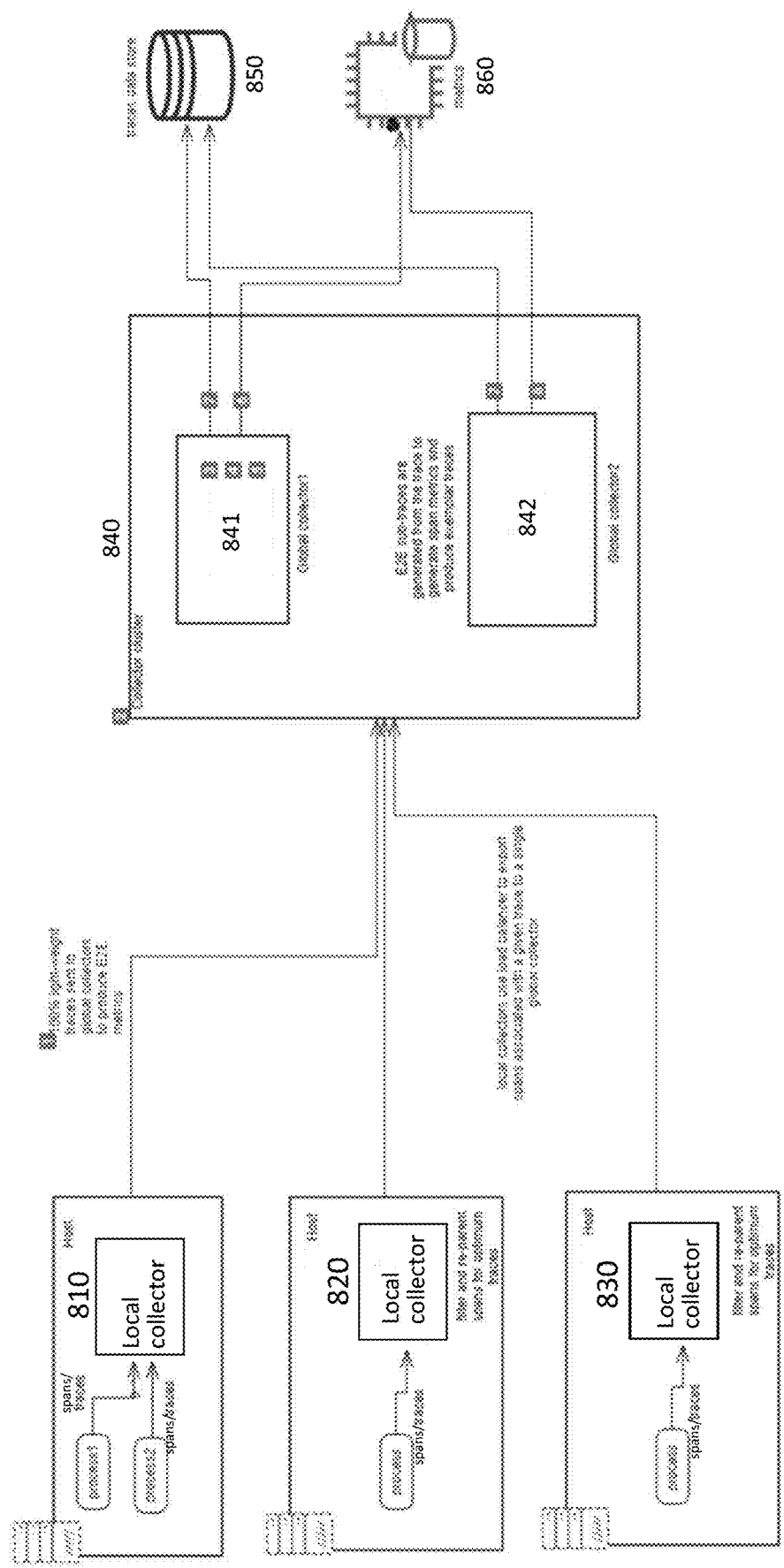
FIGS. 8A-8B illustrate a system flow for providing an end-to-end distributed traces in accordance with an exemplary embodiment.
Figure 8B:
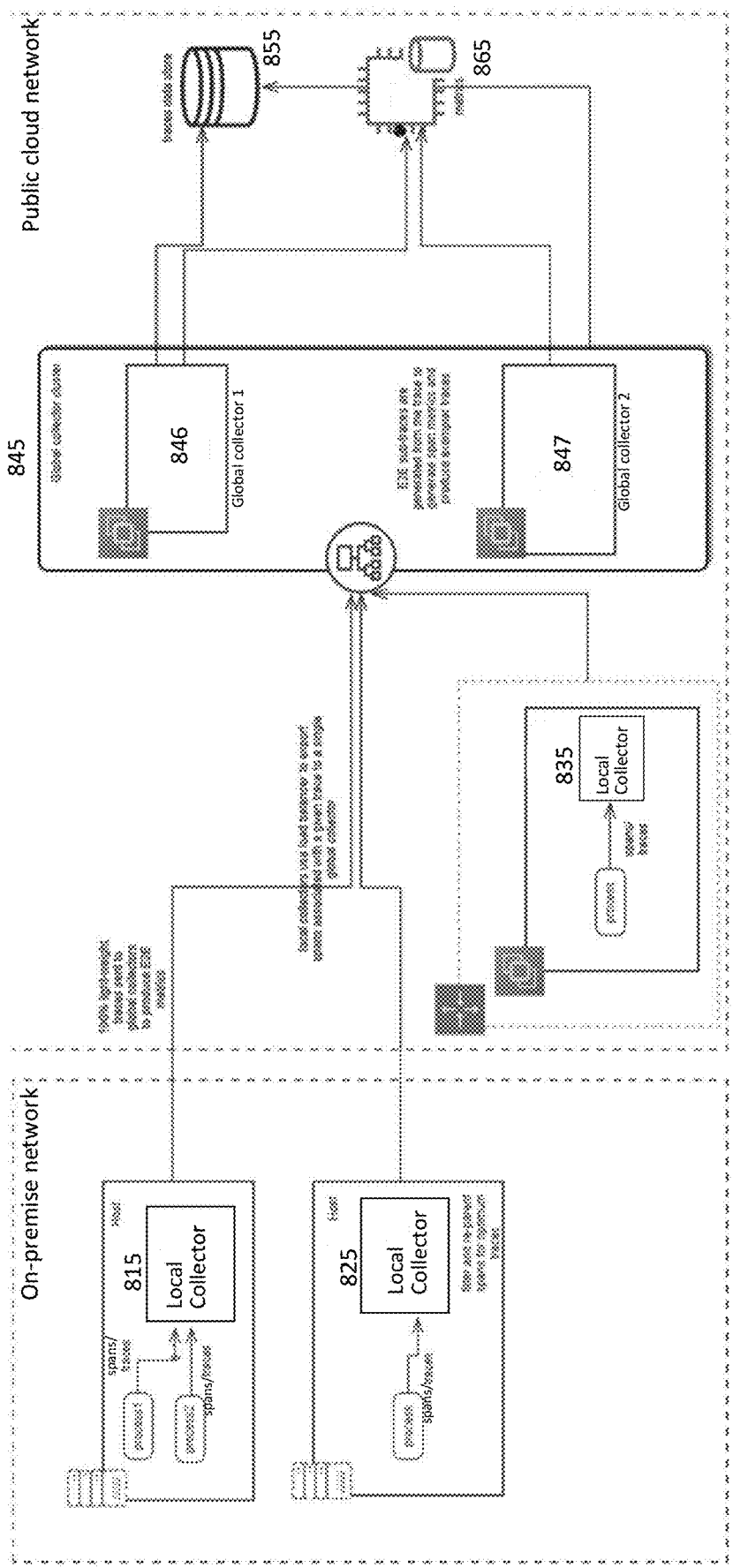

FIGS. 8A-8B illustrate a system flow for providing an end-to-end distributed traces in accordance with an exemplary embodiment.

In operation 801, each of the first local collector 810, second local collector 820, and third local collector 830 transmit or send traces corresponding to the processes performed in the local collectors to a global collector cluster 840. According to exemplary aspects, a local collector may be implemented by a combination of a memory and a processor or an integrated circuit. However, aspects of the present disclosure are not limited thereto, such that the local collector may be implemented by other suitable hardware.

The global collector cluster 840 includes a first global collector 841 and a second global collector 842. Although only two global collectors are illustrated as forming the global collector cluster 840, aspects of the present disclosure are not limited thereto, such that more global collectors may be included. According to exemplary aspects, a global collector may be implemented by a combination of a memory and a processor or an integrated circuit. However, aspects of the present disclosure are not limited thereto, such that the global collector may be implemented by other suitable hardware.

According to exemplary aspects, each of the first local collector 810, second local collector 820, and third local collector 830 may collect traces stemming from processes performed on different hosts. For example, the first local collector may collect traces generated from process 1 and process 2 executed in Host 1. Similarly, the second local collector 820 may collect traces generated from the process executed in Host 2.

Further, each of the local collectors may reside in a corresponding host server. As illustrated in FIG. 8A, the first local collector 810 may reside in host 1, the second local collector 820 may reside in host 2, and the third local collector 830 may reside in host 3. However, aspects of the present disclosure are not limited thereto, such that the local collectors may reside outside of the hosts.

As exemplarily illustrated in FIG. 8A, in operation 1, certain local collectors, such as the first local collector 810, may transmit traces or light-weight traces to the global collector cluster 840 without further processing. Meanwhile, certain other local collectors, such as the second local collector 820 and third local collector 830 may filter and re-parent spans for providing modified or optimum traces. According to exemplary aspects, optimum traces may refer to only spans representing inter-process communication between services, databases or the like.

In operation 2, one or more local collectors may use a load balancer to export spans associated with a given trace to a single global collector. Accordingly, spans may be kept as a group without being spread across different global collectors.

According to exemplary aspects, there may be differing cluster modes for forming the global collector cluster 840. For example, the cluster modes may include a global cluster mode, a regional cluster mode, and a LOB cluster mode. Global cluster mode may support end-to-end distributed traces across all owners and regions. The global cluster mode may require getting span data from all over the globe to a single cluster. Regional cluster mode may be set up per region. Such a regional cluster mode may not support end-to-end tracing for processing spanning multiple regions. Lastly, LOB cluster mode may set up cluster per LOB. Here, the LOB cluster mode may not support end-to-end tracing for processing spanning of multiple LOB services.

In operation 3, for each trace, one of the global collector (e.g., global collector 841) within the global collector cluster 840 may wait for all of the asynchronous spans for the respective trace to arrive. In operation 4, the designated global collector within the global collector cluster 840 may monitor receipt of the asynchronous spans to determine whether to continue waiting or to proceed to the next step. According to exemplary aspects, the wait may be a time-bound wait or a completeness-bound wait.

If all of the asynchronous spans for the respective trace is determined to have been received by the designated global collector within the global collector cluster 840, the designated global collector may then decompose the trace into multiple sub-traces in operation 5. According to exemplary aspects, each of the sub-traces may represent an operation performed for a discrete application function that is contained within the transaction.

In operation 6, the global collectors may derive metrics for the sub-traces, which are then sent to a centralized database for storage. In operation 7, exemplar sub-trace(s) or trace(s) may be sampled by the global collectors after it is determined to be complete and sent for storage in a traces data store.

FIG. 8B illustrates a system flow similar to that of FIG. 8A with some differences as noted below.

In FIG. 8A, each of the local collectors and global collectors were shown as residing over the same network. However, as shown in FIG. 8B, the local collectors and the global collectors may reside on the same or different networks. For example, as illustrated in FIG. 8B, the first local collector 815 and the second local collector 825 may reside on an on-premise network. The third local collector 835, on the other hand, may reside on a public cloud network. The local collectors may use a load balancer to export spans associated with a given trace to a single global collector.

The global collector cluster 845 including a first global collector 846 and a second global collector 847 may reside on public cloud network together with the third local collector 835. Traces data store 855 and the metrics database 865 may also reside on the public cloud network.

According to exemplary aspects, the provided disclosure proposes an architecture that addresses the issue with collating spans generated on different hosts asynchronously by introducing an addition group of collectors clustered under a load balancer and configure to wait for all of the asynchronous spans to arrive from the local collectors before generating corresponding metrics. The metrics are then exported for persistence and sampling of the traces. Such architecture may propose a way to decompose a trace to functional sub-traces based on use cases.

Although service level objective (SLO) is described with respect to an on-premise or private cloud network, aspects of the present disclosure are not limited thereto, such that the exemplarily disclosed architecture may support end-to-end (E2E) SLOs across an application stack and may be applied to at an enterprise-wide scale.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed: rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing end-to-end observability for distributed event-driven applications, the method comprising:

executing, by a processor, a transaction including a plurality of operations and generating a trace for the executed transaction;

receiving, by a plurality of local collectors, a plurality of spans generated from the plurality of operations executed in differing host servers;

filtering, by at least one local collector among the plurality of local collectors, asynchronous spans among the plurality of spans, such that only spans representing inter-process communications are forwarded to a global collector cluster including a plurality of global collectors;

identifying, by a load balancer, a target global collector among the plurality of global collectors for routing the spans associated with the generated trace;

transmitting, by the load balancer to the target global collector, the spans associated with the generated trace;

waiting, by the target global collector, until all of the asynchronous spans associated with a discrete path through the generated trace are received;

decomposing, by the target global collector, the trace into a plurality of sub-traces; and deriving, by the target global collector, end-to-end metrics for each of the sub-traces.

2. The method according to claim 1, further comprising:
re-parenting the internal spans, such that the internal spans may be related to one another in a parent-child relationship.

3. The method according to claim 1, wherein the global collector cluster is a global cluster mode.

4. The method according to claim 1, wherein the global collector cluster is regional cluster mode.

5. The method according to claim 1, wherein the global collector cluster is a line of business cluster mode.

6. The method according to claim 1, wherein at least one of the plurality of local collectors and at least one of the plurality of global collectors reside on a same network.

7. The method according to claim 1, wherein at least one of the plurality of local collectors and at least one of the plurality of global collectors reside on different networks.

8. The method according to claim 1, further comprising:
sampling, by the target global collector, one or more exemplary sub-traces.

9. The method according to claim 1, further comprising:
sampling, by the target global collector, the generated trace.

10. The method according to claim 1, wherein at least one of the sub-trace corresponds to an operation performed for a discrete application function contained within the transaction.

11. The method according to claim 1, wherein at least one of the plurality of operations includes one or more sub-operations.

12. The method according to claim 11, wherein a span is generated for each of the plurality of operations, and a sub-span is generated for each of the one or more sub-operations.

13. The method according to claim 1, wherein the trace is defined by a tree of the plurality of spans.

14. The method according to claim 1, wherein each of the sub-traces corresponds to an operation that is unrelated from one another.

15. The method according to claim 1, wherein each of the sub-traces include different spans from one another.

16. The method according to claim 1, wherein at least one of the plurality of local collectors reside in one of the host servers.

17. The method according to claim 1, wherein each of the sub-traces resembles a synchronous trace.

18. The method according to claim 1, wherein a span identifies a specific operation being executed, and a start time and an end time of the specific operation executed.

19. A system to provide for providing end-to-end observability for distributed event-driven applications, the system comprising:
a memory;
a display;
a processor;
a plurality of local collectors;
a plurality of global collectors; and
a load balancer,
wherein the system is configured to perform:
executing, by the processor, a transaction including a plurality of operations and generating a trace for the executed transaction;

receiving, by the plurality of local collectors, a plurality of spans generated from the plurality of operations executed in differing host servers;

filtering, by at least one local collector among the plurality of local collectors, asynchronous spans among the plurality of spans, such that only spans representing inter-process communications are forwarded to a global collector cluster including the plurality of global collectors;

identifying, by the load balancer, a target global collector among the plurality of global collectors for routing the spans associated with the generated trace;

transmitting, by the load balancer to the target global collector, the spans associated with the generated trace;

waiting, by the target global collector, until all of the asynchronous spans associated with a discrete path through the generated trace are received;

decomposing, by the target global collector, the trace into a plurality of sub-traces; and deriving, by the target global collector, end-to-end metrics for each of the sub-traces.

20. A non-transitory computer readable storage medium that stores a computer program for providing end-to-end observability for distributed event-driven applications, the computer program, when executed by a processor, causing a system to perform a plurality of processes comprising:

executing a transaction including a plurality of operations and generating a trace for the executed transaction;

receiving, by a plurality of local collectors, a plurality of spans generated from the plurality of operations executed in differing host servers;

filtering, by at least one local collector among the plurality of local collectors, asynchronous spans among the plurality of spans, such that only spans representing inter-process communications are forwarded to a global collector cluster including a plurality of global collectors;

identifying, by a load balancer, a target global collector among the plurality of global collectors for routing the spans associated with the generated trace;

transmitting, by the load balancer to the target global collector, the spans associated with the generated trace;

waiting, by the target global collector, until all of the asynchronous spans associated with a discrete path through the generated trace are received;

decomposing, by the target global collector, the trace into a plurality of sub-traces; and deriving, by the target global collector, end-to-end metrics for each of the sub-traces.

* * * * *